United States Patent

Reed

[11] Patent Number: 4,485,588
[45] Date of Patent: Dec. 4, 1984

[54] WIPER BAR SYSTEM

[76] Inventor: Roger W. Reed, 5107 Whitehead Rd., Hillsboro, Mo. 63050

[21] Appl. No.: 506,200

[22] Filed: Jun. 20, 1983

[51] Int. Cl.³ .............................................. A01G 13/00
[52] U.S. Cl. ......................................... 47/1.5; 47/1.7
[58] Field of Search .................... 47/1.5, 1.7, 48.5, 81; 401/207, 140; 119/72.5, 72; 222/187

[56] References Cited

U.S. PATENT DOCUMENTS

| | | | |
|---|---|---|---|
| 897,131 | 8/1903 | Owen | 47/81 |
| 2,804,291 | 8/1957 | Segerstad | 47/81 |
| 3,184,888 | 5/1965 | Fruth et al. | 47/1.5 |
| 4,332,107 | 6/1982 | Reed | 47/1.5 |

FOREIGN PATENT DOCUMENTS 89763   9/1983   European Pat. Off. ................ 47/81

Primary Examiner—Robert A. Hafer
Assistant Examiner—Bradley M. Lewis
Attorney, Agent, or Firm—D. A. N. Chase; Michael Yakimo, Jr.

[57] ABSTRACT

A wiper bar system, transversing a tractor's path, comprises a fluid housing with open fluid channel therein, a wiper blade and a moisture absorbent wick surrounding the wiper blade. The fluid housing is mounted to the rear face of the wiper blade with a portion of the wick interposed therebetween. The spatial relationship between the fluid housing and wiper blade is adjustable by the user to control the amount of fluid/herbicide flowing from the fluid channel to the interposed wick and ultimately the amount of fluid/herbicide delivered to the portion of the wick surrounding the weed-contacting surface of the wiper blade.

10 Claims, 8 Drawing Figures

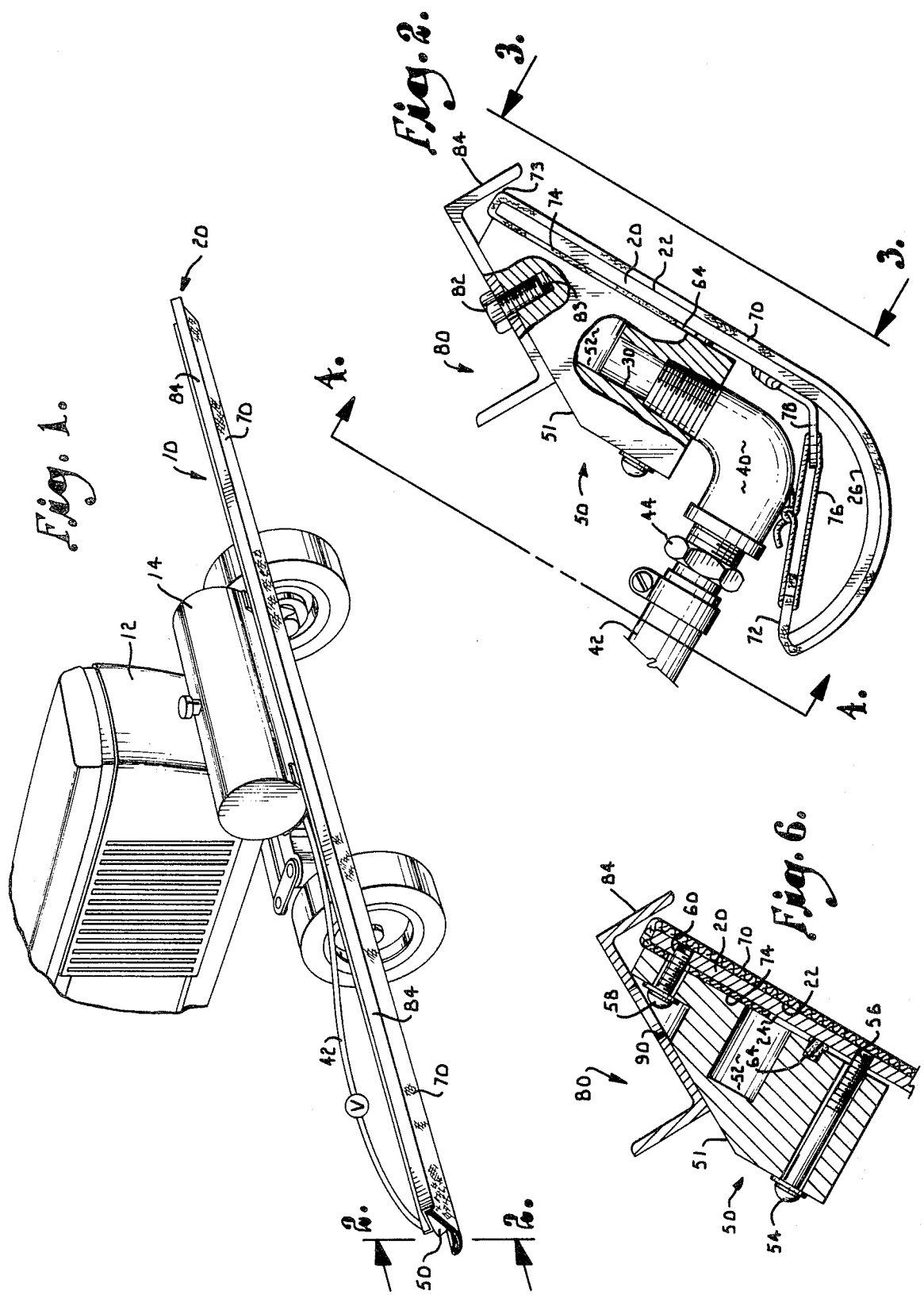

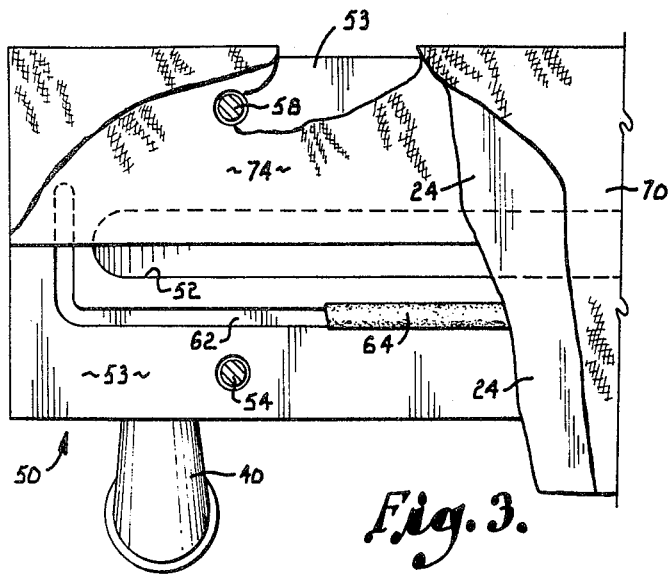
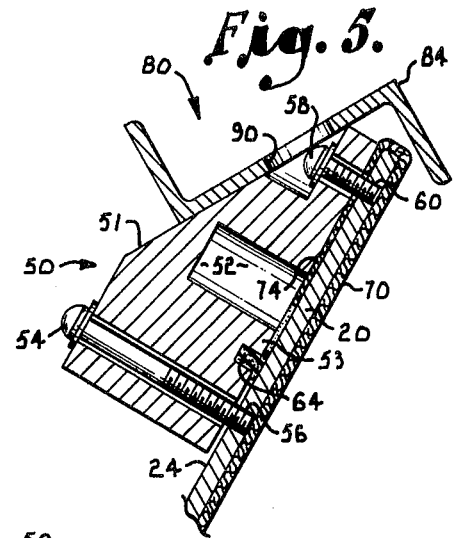
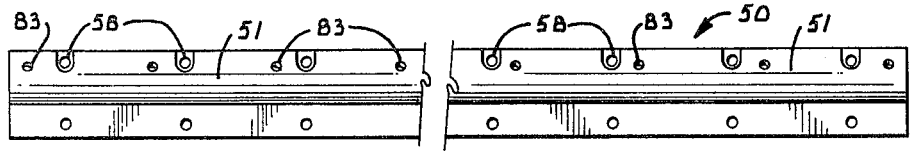
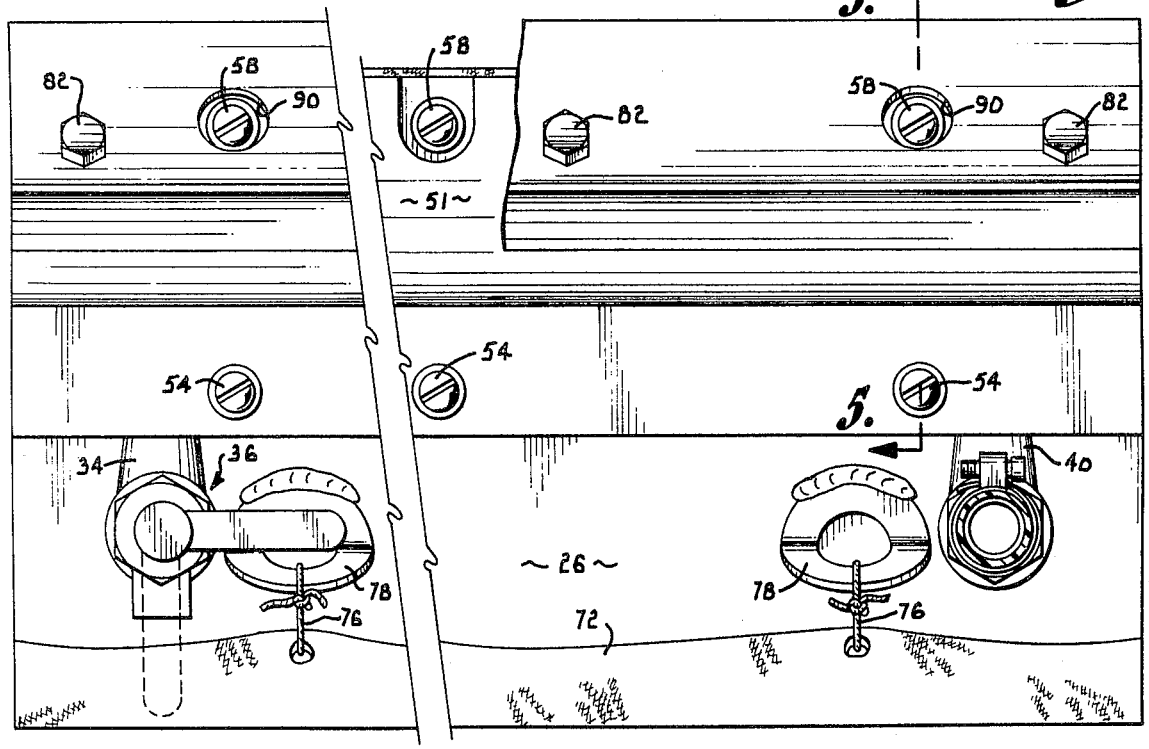
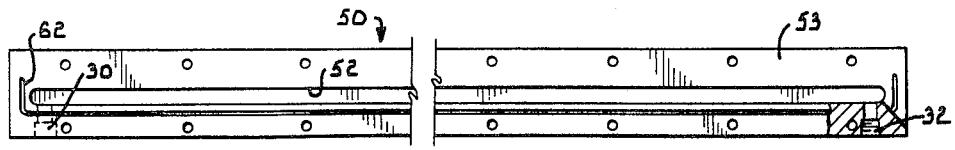

4,485,588

WIPER BAR SYSTEM

BACKGROUND OF THE INVENTION

This invention relates to a wiper bar system and, more particularly, to a wiper bar utilizing a spatially adjustable fluid housing/wiper blade combination to regulate the flow of herbicide to a wick member interposed therebetween.

The elimination of weeds from farm crops is desired so as to allow the crops to reach a mature growth and present an optimal crop yield. Different methods are used for the removal of undesirable vegetation/weeds from the desirable vegetation/crops. These methods range from a highly labor-intensive hand removal of weeds to the field application of herbicides to kill the undesirable vegetation. The latter method of herbicide application includes the spraying of a "selective" herbicide on the crop to the detriment of selected vegetation, particular to the employed herbicide, but without harm to the growing crop. Another method utilizes the application of herbicides of the "non-selective" type which kill all vegetation upon contact. Accordingly, this latter method requires that the non-selective herbicide contacts only the vegetation to be eliminated.

Wiper bar systems are used for direct application of non-selective herbicides to weeds. The wiper bar system includes a herbicide-saturated material, referred to as a wick, transversely attached to the front of the tractor and raised above the level of the growing crop. Upon driving the tractor through the fields the saturated wick, transverse to the tractor's path, contacts the weeds extending above the level of the growing crop with a concurrent transfer of the herbicide thereto.

Although effective in use, problems have arisen with the use of wiper bars particularly as to the control of the fluid flow of the herbicide to the absorbent material/wick. If too much herbicide is delivered to the wick it may drip onto the underlying crop and damage the same. If too little herbicide is communicated to the wick, contact with the undesirable vegetation may have no killing effect. In either case the cost effectiveness of use is increased whether in the costs of the wasted herbicide and crop damage or in labor and fuel costs arising when another pass of the wiper bar over the fields is required.

Accordingly, various wiper bar structures have arisen which address the regulation of a fluid flow of the herbicide to the wick member. Although assumably effective in their use, relatively complex systems have arisen which influence among other factors the purchase cost and ease of maintenance and use.

In response thereto, I have invented a novel wiper bar system utilizing an elongated wiper blade having front and rear faces with the front face having the wick material positioned thereon. An elongated fluid housing, having an open fluid channel therein, is releasably fastened by a plurality of screws to the rear face of the wiper blade with the rear face then operating as a closure member for the open fluid channel. A free edge of the wick is interposed between the fluid housing and this rear face of the wiper blade and in communication with the fluid channel. Upon delivery of the herbicide to the fluid channel from a fluid reservoir, the free edge of the wick material absorbs the herbicide which in turn is transferred to the functional wick/weed contacting portion extending about the front face of the wiper blade. The degree of moisture of the wick is regulated by adjusting the degree of closure afforded the open channel by the rear face of the wiper blade via screw adjustment by the operator. This adjustment spatially displaces the fluid housing from the wiper blade which controls the amount of herbicide available for absorption by the interposed wick and ultimately delivered to the functional portion of the wick contacting the noxious weeds.

It is therefore a general object of this invention to provide a wiper bar system employing a novel method of controlling the fluid flow of a herbicide available to an absorbent wick material.

Another object of this invention is to provide a wiper bar, as aforesaid, which utilizes a housing, having a fluid channel therein, positioned in a user-adjustable spatial relationship with a surface of a wiper blade with the degree of said relationship controlling the flow of herbicide available to the functional portion of the wick.

Still another object of this invention is to provide a wiper bar, as aforesaid, in which the degree of closure of the fluid housing channel afforded by the wiper blade influences the capillary action of the herbicide along the wick material.

A more particular object of this invention is to provide a wiper bar, as aforesaid, in which the fluid housing/wiper blade relationship presents a herbicide well therebetween with a portion of the wick immersed in said well for drawing off the herbicide therein.

Other objects and advantages of this invention will become apparent from the following description taken in connection with the accompanying drawings, wherein is set forth by way of illustration and example, an embodiment of this invention.

BRIEF DESCRIPTION OF THE DRAWINGS

FIG. 1 is a perspective view illustrating the wiper bar system mounted to the front of a tractor.

FIG. 2 is a sectional elevation view, taken along line 2—2 in FIG. 1, with portions thereof broken away to show the inlet port assembly of the fluid housing and the means of attachment of a deflector blade thereto.

FIG. 3 is an elevation view, taken along line 3—3 in FIG. 2, with portions of the wiper blade, wick and gasket removed to show the interrelationship among the fluid housing, fluid channel, wick and wiper blade.

FIG. 4 is a rear view of the wiper blade, taken along line 3-3 in FIG. 2 but foreshortened for purposes of illustration, and showing the fluid inlet and outlet assemblies, the deflector blade with a portion broken away to show the underlying fluid housing, and the means of attachment of the lower edge of the wick material to the wiper blade.

FIG. 5 is a sectional view, taken along line 5—5 in FIG. 4, showing a first closure position of the fluid housing channel afforded by the wiper blade which allows for a minimal flow of herbicide available to the wick material interposed therebetween.

FIG. 6 is a sectional view similar to that of FIG. 5 but showing a second closure position of the fluid housing channel afforded by the wiper blade which allows for a greater flow of herbicide available to the interposed wick material relative to that shown in FIG. 5.

FIG. 7 is a perspective view of the fluid housing, on a reduced scale.

FIG. 8 is a rear view of the fluid housing showing the open fluid channel in the interior face thereof and the inlet and outlet ports in communication with said fluid channel.

DESCRIPTION OF THE PREFERRED EMBODIMENT

Turning to the drawings, FIG. 1 shows the wiper bar system 10 mounted to the front end of a tractor 12 with a reservoir 14 mounted thereon. The wiper bar system 10 is hydraulically mounted (not shown) to the tractor 12 in relative, vertical motion to the ground surface.

More particularly the wiper bar system 10 comprises an elongated wiper blade 20, transversing the path of the tractor 12, and having a front face 22 and rear face 24 thereof. Mounted to the rear face 24 of the blade 20 is an elongated fluid housing 50 having an elongated open channel 52 extending along the width of the interior face 53 thereof. Encircling the channel 52 on three sides thereof there is a U-shaped seat 62 for receiving gasket 64 therein.

The lower portion of fluid housing 50 is mounted to the rear face 24 of blade 20 by a plurality of screws 54 extending below the channel 52 and engaging tapped orifices 56 in the rear face 24 of the wiper blade 20. The top portion of the fluid housing 50 is also mounted to the rear face 24 by a plurality of adjustment screws 58 engaging tapped orifices 60 in the wiper blade 20.

Prior to mounting the above-described fluid housing 50 to the wiper blade 20 a sheet of wick material 70 is fastened to the wiper blade 20 by means of laces 76 extending from the lower edge 72 of the wick 70 and tied to eyelets 78 extending from the lower portion 26 of the inside face 24 of the wiper blade 20. The wick 70 extends about the front face 22 of the blade 20 with the upper portion 74 of the wick 70 extending above the top edge of the wiper blade 20 and along a portion of the rear face 24 thereof. As shown in FIG. 3, upon the fastening of fluid housing 50 to the wiper blade 20 the upper edge 74 of the wick 70 is interposed therebetween in a position overlapping a portion of the channel 52. The rear face 24 of the wiper blade 20, broken away in FIG. 3, covers channel 52 so as to act as a closure device, e.g. as a lid, for this open channel 52.

In communication with this channel 50 are fluid inlet and outlet ports 30 and 32 extending through the housing 50 at the opposed ends thereof as shown in FIG. 8. The inlet port 30, as shown in FIG. 2, receives a tapped elbow 40 therein which is in communication with a hose 42 extending to the reservoir 14. A filter 44 is interposed between the elbow 40 and hose 42. At the opposed end of the channel 50 is an outlet port 32 having an elbow 34 therein in communication with petcock 36.

Fastened atop the inclined surface 51 of housing 50 by bolts 82 engaging orifices 83 therein is a flange member 80 having a protective shield 84 extending along the length of housing 50 and top edge of the wiper blade 20. Shield 84 precludes contact of the top edge 73 of wick 70 with the vegetation so as to preclude wear thereat. Undesirable wear at edge 73 can cause separation of the functional/contacting portion of wick 70 from its upper edge 74 which thus effects the transfer of herbicide from the upper edge 74 to lower edge 72 of wick 70 in a manner to be subsequently described.

In use, a fluid flow of the herbicide from reservoir 14 is communicated to the channel 52 via a valve-controlled hose 42 and inlet port 30. Petcock 36 may be temporarily opened to purge any blocking air from the chanbnel 52 and thus allow an initial fluid flow therein. The herbicide flows from the channel 52 and into the space between the face 53 of the fluid housing 50 and the rear face 24 of the wiper blade 20. This space is sealed on three sides by gasket 64 so as to present a well of herbicide therebetween. The upper edge 74 of wick 70 is immersed into this well through the mouth/opening provided by the absence of gasket 64 along the top edge of channel 52. Accordingly, the upper edge 74 of wick 70 draws off herbicide from this well with the remaining portion of wick 70, between the upper 74 and lower 72 edges, being subsequently moistened by capillary action of the absorbed fluid. Thus, the degree of closure or opening between the rear face 24 and channel 52 controls the amount of fluid flowing from channel 52 into this gap/well as well as the capillary action of the fluid to the remaining portion of wick 70.

The spatial relationship between the fluid housing 50 and wiper blade rear face 24 is determined by user adjustment of screws 58. User-access is provided to screws 58 by aligned orifices 90 in protective flange 80, as shown in FIG. 4. As shown in FIG. 5, the plurality of adjustment screws 58 are substantially tightened so as to approach a full seating in their respective orifices 60. Thus, a minimal spatial relationship or gap is presented corresponding to a minimal fluid flow from the channel 52 for delivery/absorption to the interposed portion of wick 70. Moreover, this minimal gap restricts the capillary action of the fluid so that the remaining functional portion of the wick 70 is relatively dry in herbicide content.

As shown in FIG. 6, an intermediate position of the screw 58 further displaces the housing face 51 from blade face 24 and thus increases the spatial relationship or gap therebetween. Accordingly, a relatively greater fluid flow from channel 52 into the gap/well is provided, along with a lesser impediment to the capillary action of the absorbed fluid. Thus, a relatively greater amount of moisture is delivered to the functional portion of wick 70 covering the front face 22 of the wiper blade 20. Although not shown, it is understood that the adjustment screws 58 can be further backed off so as to increase the displacement between the housing 53 and blade 24 faces and ultimately the quantity of herbicide delivered to the functional/weed-contacting portion of wick 70.

Accordingly, the degree of closure of channel 50 afforded by the rear face 24 of wiper blade 20 presents a spatial relationship between the housing 50 and wiper blade 20 which is easily adjustable by the user. This relationship effects the amount of fluid available for absorption by the upper edge 74 of wick 70 and ultimately delivered to the functional facing surface of the wick 70. Thus, the amount of herbicide ultimately provided to the functional portion of the wick 70 is easily regulated by the above-described structure.

It is herein noted that the front face 22 of wiper blade 20 is canted, relative to the horizontal, and cooperates with curved portion 26 to present a greater contact surface to the upstanding weeds. Accordingly, the transverse wiper blade 20 may then be passed through the field for a killing contact with the upstanding vegetation with assurance that a cost-effective amount of fluid, corresponding to the surrounding circumstances, is being utilized.

It is to be understood that while certain forms of this invention have been illustrated and described, it is not limited thereto, except in so far as such limitations are included in the following claims.

Having thus described the invention, what is claimed as new and desired to be secured by Letters Patent is:

1. A wiper bar for transferring liquid to vegetation upon contact therebetween comprising:

a fluid housing having a fluid channel therein;

an elongated plate having a surface for closing said channel;

a wick member having a first portion interposed between said channel and said plate member and a second portion extending from said first portion and about an opposed surface of said plate for contact with said vegetation;

means for communicating said liquid to said channel thereby moistening said first portion of said wick; and means for adjusting the degree of closure of said channel afforded by said plate surface to control the amount of said liquid flowing from said channel and onto said first wick portion whereby to control the amount of said fluid available for flow to said second portion of said wick.

2. The apparatus as claimed in claim 1, wherein said adjusting means comprises a plurality of spaced-apart fastener elements for joining said housing to said plate, said fasteners engageable with said plate in a manner to selectably space said housing from said plate to present a fluid gap therebetween in communication with said channel for immersion of said first wick portion therein.

3. The apparatus as claimed in claim 2, wherein said fastener elements comprises a plurality of screws passing through said housing and engaging tapped orifices in said plate, said screws functionally engaging said orifices in a manner providing for said spacing of said housing from said plate and presenting said fluid gap therebetween.

4. The apparatus as claimed in claim 2, wherein a gasket substantially surrounds said channel to seal said gap, said gasket having a void therein to present a spatial relationship between said housing and said plate corresponding to said degree of closure and presenting a mouth for insertion of said first wick portion therein.

5. A wiper bar system comprising:

a fluid housing having a face presenting a fluid channel therein;

means for communicating a fluid flow to said channel;

a wiper blade having front and rear faces;

means for fastening a first portion of said housing face to one of said faces of said wiper blade;

means for adjustably engaging a second portion of said housing face to said one face of said wiper blade; and a sheet of fluid absorbent material on said blade and having first and second spaced-apart edges with said first edge interposed between said one face and said housing face, said adjustable engagement means operable to vary the spatial relationship between said housing face and said one face of said wiper blade, said spatial relationship regulating the flow of fluid from said channel onto said first edge of said material and available for flow to said second edge of said material whereby to control the fluid content of said material on said blade.

6. The apparatus as claimed in claim 5, wherein said fastening means comprises a plurality of spaced-apart fastener elements extending between said first portion of said housing face and said one face of said wiper blade.

7. The apparatus as claimed in claim 6, wherein said engaging means comprises a plurality of fastener elements extending between said second portion of said housing face and said one face of said wiper blade, said fastener elements operable to vary the distance between said second portion and said one face to present said spatial relationship therebetween.

8. The apparatus as claimed in claim 7, wherein said housing and wiper blade faces contact said first edge of said material to influence the capillary action of said fluid therein.

9. The apparatus as claimed in claim 7, wherein said second portion is superiorly disposed relative to said first portion and movable relative thereto whereby to present a well fed by said fluid channel and defined by said housing face and said one face of said wiper blade, said well having said first material edge immersed therein for drawing said fluid therefrom for delivery to said second edge of said material.

10. A wiper bar system comprising:

a fluid housing presenting a fluid channel therein;

means for communicating a fluid flow to said channel;

a lid for closing said open channel;

means for fastening a first portion of said housing to said lid;

means for adjustably engaging a second portion of said housing face to said lid; and a sheet of moisture absorbent material on said blade and having first and second spaced-apart edges with said first edge interposed between said housing face and said lid, said adjustable engagement means operable to vary the spatial relationship between said housing face and said lid for regulating the amount of fluid available for absorption by said first edge of said material and flow of said fluid to said second edge of said material whereby to control the moisture content of said material therebetween.

* * * * *